Oct. 25, 1938.  A. McKONE  2,134,233

LOGGING TRAILER

Filed June 17, 1937  2 Sheets-Sheet 1

Inventor
Archie McKone
By Albert E. Dieterich
Attorney

Oct. 25, 1938.　　　A. McKONE　　　2,134,233
LOGGING TRAILER
Filed June 17, 1937　　　2 Sheets-Sheet 2

Inventor
Archie McKone

Patented Oct. 25, 1938

2,134,233

UNITED STATES PATENT OFFICE 2,134,233

LOGGING TRAILER

Archie McKone, Vancouver, British Columbia, Canada, assignor to Pioneer Timber Co., Ltd., Vancouver, British Columbia, Canada Application June 17, 1937, Serial No. 148,774

7 Claims. (Cl. 280—80)

This invention relates to improvements in heavy duty trailers and more specifically to logging trailers adapted for the carrying of long and extremely heavy loads over rough trails and roads.

The improvements are particularly directed towards providing a more efficient and powerful trailer than those generally in use, and particular attention has been given towards improving and strengthening those parts of the trailer upon which the most severe strains are set up.

My invention comprises dual wheels mounted between pairs of walking beams that are pivoted upon both sides of the trailer body, and means have been provided for the partial removal of the outer walking beams to facilitate the renewal or replacing of the tires or wheels of the vehicle.

A particular object of my invention is to improve upon and strengthen the manner of mounting of the wheels of trailers.

Another important object of my invention has been to provide means whereby the load is more universally disposed over the wheel mounting of the vehicle than is usually done.

Another object of my invention is to provide a trailer capable of operating over the roughest grounds without setting up of unusual strains upon any particular part of the vehicle through uneven ground conditions.

A further object of my invention is to provide a trailer in which there is no spring suspension of the traction gear or load, preferably supporting the load directly upon resilient bearings such as rubber.

With these and other objects in view, I have invented the logging trailer which is the subject matter of this application and which is more detailedly described in the following specification and illustrated in the accompanying drawings forming part of this application, and in which.

In these drawings like numerals indicate like parts and the numeral 1 indicates the bed plate of a trailer body under which is mounted a reach pole 2 adjustable in the end guides 3.

Figure 1:
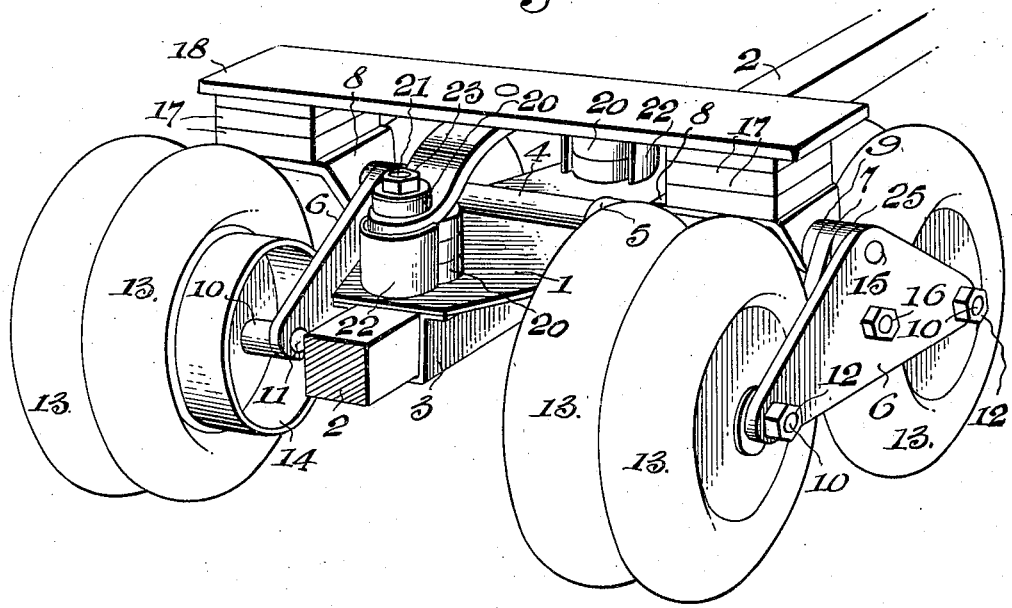
Figure 1 is a perspective end view of the trailer showing one of the brake drums and illustrating how the outer ends of the bunk are supported in alignment with and directly between the wheels of the trailer.

The bed plate 1 is pivotally mounted upon a tubular cross member or shaft 4 by a number of brackets 5 which are welded upon top of the bed plate, one of which is distinctly shown in Figure 1.

The outer end of the tubular cross shaft 4 is supported in a pair of walking beams 6 on each side of the bed plate 1.

Figure 4:
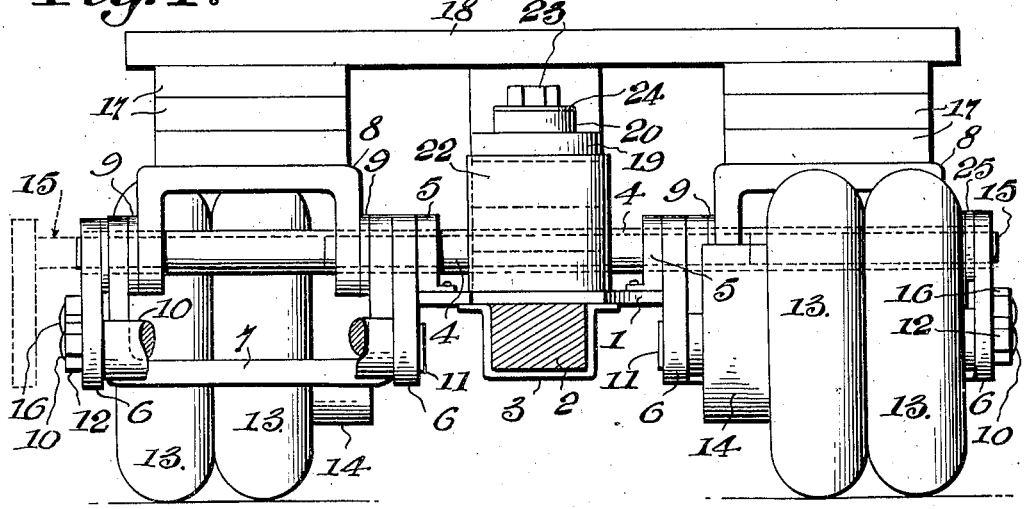
Figure 4 is an end view of the trailer with one pair of wheels removed to illustrate the pivotal mounting of the rocking beams and the manner of supporting the outer ends of the bunk.
Figure 2:
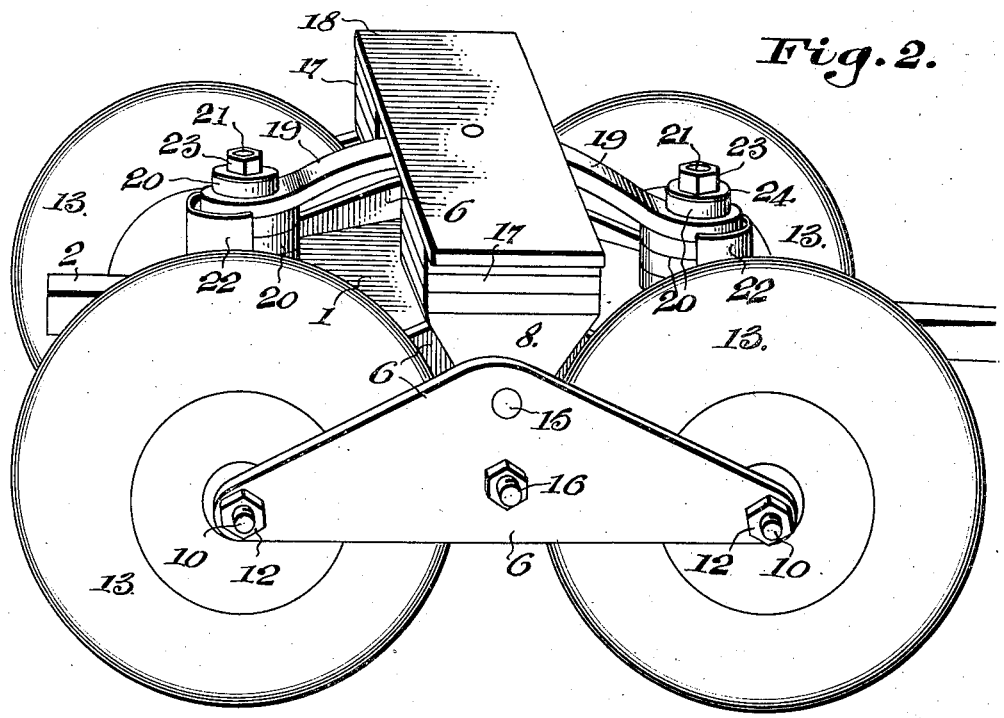
Figure 2 is a perspective side view of the trailer showing the outer rocking beam and the resilient mounting of the bunk.

The walking beams are spaced apart centrally by a U bracket 7 suspendedly mounted upon the cross shaft 4. Intermediately of the arms of the U bracket 7 is pivotally mounted the bearing bracket 8 which in cross section is also a U bracket. (See Figure 4.)

Spacing washers 9 are mounted upon the cross shaft 4 intermediately of the arms of the bearing bracket 8 and U bracket 7.

The outer ends of the walking beams 6 are spaced apart by the axles 10, the inner end 11 of which is preferably welded or secured to the inside walking beam while the outer ends of the axles 10 are secured in the outer beam by the nuts 12.

Upon each of the axles 10 are mounted the dual wheels 13, to the inner wheels of which are mounted the brake drums 14. (See Figure 1.)

Centrally and adjacent the top of each outer walking beam and upon the inner face or surface is secured a mounting pin 15, which registers or fits the bore of the tubular cross shaft 4 and extends therein a reasonable distance, approximately 24 to 30 inches.

Immediately below the mounting of the pin 15 and upon the front or outer face of the walking beam is positioned a bolt 16 which engages with a threaded aperture formed in the outer arm of the U bracket 7.

Figure 3:
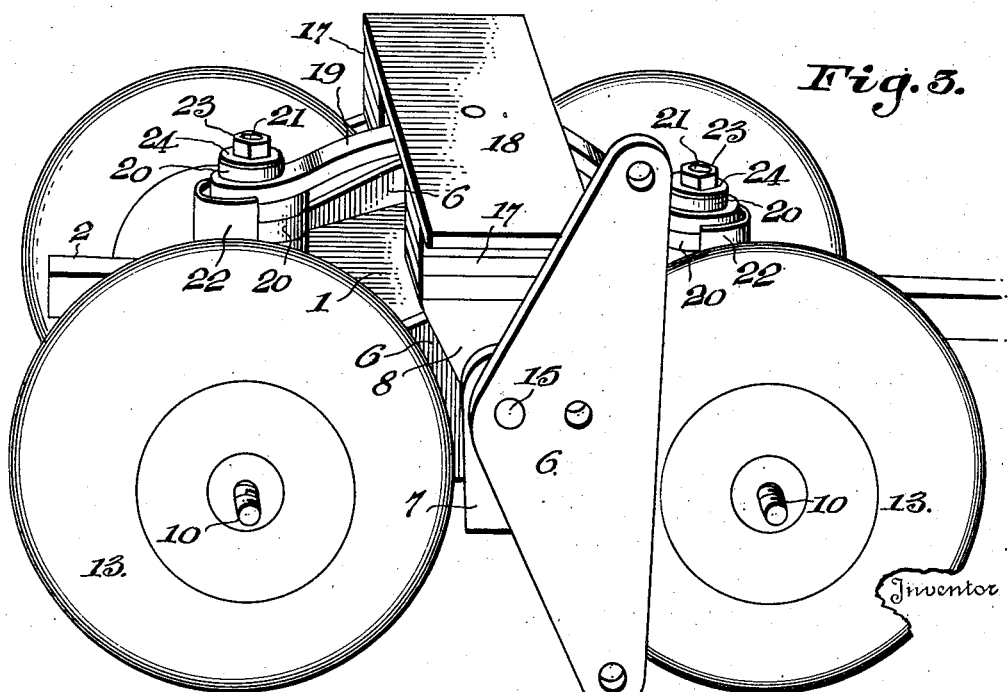
Figure 3 is a perspective side view of the trailer illustrating the manner of pivoting the outer rocker beam for the purpose of replacing of the tires or wheels.

When it becomes necessary to replace a tire or wheel 13, the bolt 16 is disengaged and the nuts 12 of the axles 10 are removed and the outer walking beam 6 is pried outwardly (being supported by the pin 15) until the outer walking beam 6 clears the ends of the axles 10, when it is possible to tilt and pivot the walking beams upon the pin 15 until the beam clears whichever wheel it is desired to work upon. Figure 3 illustrates this operation.

This construction permits the servicing of the trailer by the operator without the use of a derrick or chain blocks, and, as each of the walking beams weighs approximately a thousand pounds, it would be an impossible task to handle these beams without help if they had to be completely removed from their mountings.

Mounted upon top of the pivoted bearing brackets 8 and secured in any suitable manner are blocks of resilient material 17 of the nature of rubber, to comprise end supports for the bunk 18 of the trailer. See Figures 1 to 4.

The bunk 18 is supported intermediately of the resilient bearings 17 by a bridge member 19, the ends of which are also mounted upon and between resilient blocks of material 20, positioned upon threaded spindles or bolts 21, the lower ends of which are secured to the main bed plate of the trailer by welding. The resilient end bearings 20 of the bridge member 19 are protected by suitable shields 22.

The spindles 21 are provided with nuts 23 for securing of the assembly of the bridge member 19 but, before the nuts are applied, a resilient block of material is positioned directly upon top of the ends of the bridge member, and then a washer or plate 24 is applied, and then the nuts 23; thus the ends of the bridge member become secured upon and between resilient bearings.

The outer ends of the tubular cross shaft 4 are supported in collars 25, welded upon the inner face of the outer walking beams 6. (See Figure 1.)

The above description covers the salient features of construction of my invention, all or any of which could be subject to minor modifications without departing from the spirit of my invention or the scope of the appended claims.

Having now described my invention and the nature of same, what I claim and desire to be protected in, by Letters Patent, is:

1. In a logging trailer of the kind described, the combination comprising, a wheeled springless chassis having a centrally pivoted body, a transversely and pivotally mounted bunk on said chassis, resilient end bearings of the nature of rubber for said bunk, a center support for said bunk, resilient bearings for said support, said last named bearings being mounted upon said centrally pivoted body.

2. In a logging trailer of the kind described, the combination comprising, a wheeled springless chassis having a centrally pivoted body, a transverse and independently pivotally mounted bunk on said trailer, resilient end bearings of the nature of rubber for said bunk, said end bearings being supported independently of said pivoted body, a center support for said bunk, resilient bearings for said support, said last named bearings being mounted upon said centrally pivoted body.

3. In a logging trailer of the kind described, a wheeled springless chassis including a central pivoted body, a tubular cross shaft or trunnion bearing carried on said body, spaced apart dual side frames, said trunnion bearing being pivotally mounted in said side frames, axles mounted between said side frames, wheels on said axles, means to remove the outer side frames from said axles to service said wheels, a bunk on said trailer mounted above said pivoted body, resilient end bearings of the nature of rubber for said bunk, said end bearings being supported independently of said central pivoted body, a center support for said bunk mounted upon said central pivoted body, resilient bearings for said center support, and means pivoting the end bearings of said bunk whereby said bunk moves in unison with said central pivoted body and center support of said bunk.

4. In a logging trailer of the kind described, a wheeled springless chassis including a tubular trunnion bearing, a pivoted body mounted on said trunnion bearing, spaced apart dual side frames, said trunnion bearing being mounted in said side frames, a mounting pin for each of the outer said side frames, said mounting pin fitting the bore of the tubular trunnion bearing to provide a pivot bearing for said outer frame, axles mounted between said side frames, wheels on said axles, and means to receive the ends of said axles in said outer frame, a bunk on said trailer mounted above said pivoted body, resilient end bearings of the nature of rubber for said bunk, said end bearings being supported independently of said central pivoted body, a center support for said bunk mounted upon said central pivoted body, resilient bearings for said center support, and means pivoting the end bearings of said bunk whereby the latter moves in unison with said central pivoted body and center support of said bunk.

5. In a logging trailer of the kind described, the combination comprising, a springless wheeled chassis which includes a reach pole carrying base plate pivotally mounted on a horizontal shaft and means to support said shaft by the wheels of the chassis, an independently pivoted load-bearing bunk mounted above said base plate, and means resiliently supporting said bunk above said base plate.

6. In a logging trailer of the kind described, the combination comprising, a springless wheeled chassis that includes a centrally pivoted reach pole carrying base plate, an independently pivoted transversely disposed load-bearing bunk, means for supporting said bunk above said base plate, and rubber elements intermediate the pivoted brackets and said bunk.

7. In a logging trailer of the kind described, a four-wheeled springless chassis including a transverse tubular shaft disposed midway between the front and back sets of wheels, a base plate located longitudinally between the wheels at one side and those at the other side and pivotally mounted on said shaft, a bunk located above said base plate parallel to said shaft, means pivotally and resiliently mounting the ends of said bunk on said shaft, a bridge member secured to and extending forwardly and rearwardly from said bunk over said base plate, and resilient means connecting the ends of said bridge member to said base plate.

ARCHIE McKONE.